June 27, 1967   A. P. STIKKERS ETAL   3,327,604
RECIRCULATING EXHAUST FAN AND HEAT UNIT
Filed Oct. 22, 1965   3 Sheets-Sheet 1

INVENTORS
ALEXANDER P. STIKKERS
DIETER H. HELLMANN
BY
ATTORNEY

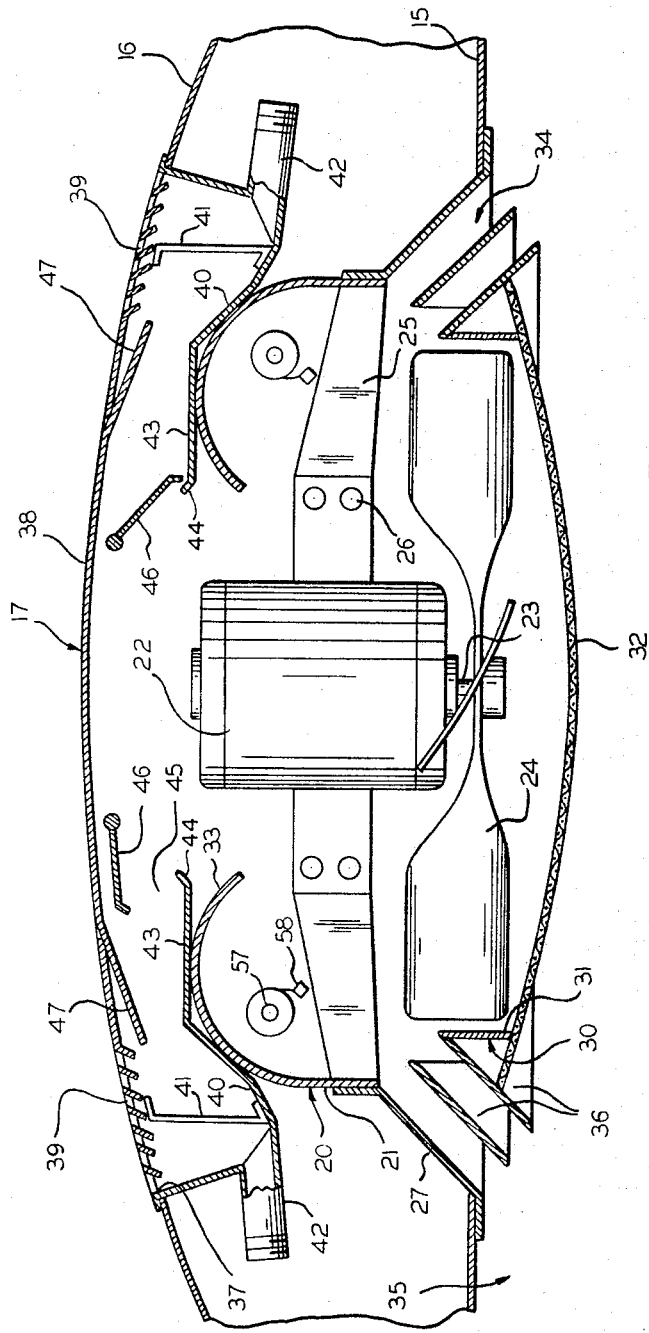

United States Patent Office 3,327,604
Patented June 27, 1967

3,327,604
RECIRCULATING EXHAUST FAN AND
HEAT UNIT
Alexander P. Stikkers, Elgin, Ill., and Dieter H. Hellmann,
Pierrefonds, Quebec, Canada, assignors to Vapor Corporation, Chicago, Ill., a corporation of Delaware
Filed Oct. 22, 1965, Ser. No. 501,014
3 Claims. (Cl. 98—10)

ABSTRACT OF THE DISCLOSURE

Vehicle ceiling mounted fan for exhausting and recirculating air from a vehicle with rain eliminating means coacting with dampered exhaust openings and means for partially recirculating air when the exhaust openings are closed.

---

The present invention relates in general to a circulating fan unit for use in transportation vehicles, such as railway passenger and freight vehicles, and more particularly to a circulating fan unit for such a vehicle that is capable of providing air circulation within the vehicle or ventilation by exhausting of air from the vehicle, and still more particularly to a circulating fan unit capable of conditioning and circulating air within a vehicle, and still more particularly to a circulating fan unit employed to reinforce the air circulation pattern within a passenger vehicle for maximum passenger comfort.

The circulating fan unit of the present invention may be easily and quickly installed in the roof and ceiling structure of a vehicle, and incorporates a fan, a motor for driving the fan, dampers for controlling air flow patterns, damper operators for operating the dampers, temperature conditioning means such as an electric heater, rain eliminators, an exhaust roof grill, an interior air intake grill, and an interior louver or register to discharge recirculated air.

It is therefore an object of the present invention to provide a circulating fan unit to be installed in the roof and ceiling structure of a vehicle that is a self-contained unit capable of circulating air within the vehicle, and exhausting air from the vehicle while at the same time circulating some air within the vehcle.

Another object of this invention resides in the provision of a circulating fan unit for a vehicle capable of conditioning air to be recirculated within the vehicle.

A further object of this invention is to provide a compact, self-contained fan unit for a passenger vehicle to be mounted in the ceiling and roof structure thereof, and which incorporates a fan, a motor for the fan, dampers, operators for the dampers, heating elements, rain eliminators, exhaust roof grill, interior air intake grill, and interior louver or register grill for discharging recirculated air.

Othe objects, features and advantages of the invention will be apparent from the following detailed disclosure, taken in conjunction with the accompanying sheets of drawings, wherein like reference numerals refer to like parts, in which:

FIG. 4 is a schematic vertical sectional view taken through the unit and illustrating the position of the parts as the unit is mounted in the roof and ceiling structure of a vehicle.

Figure 1:
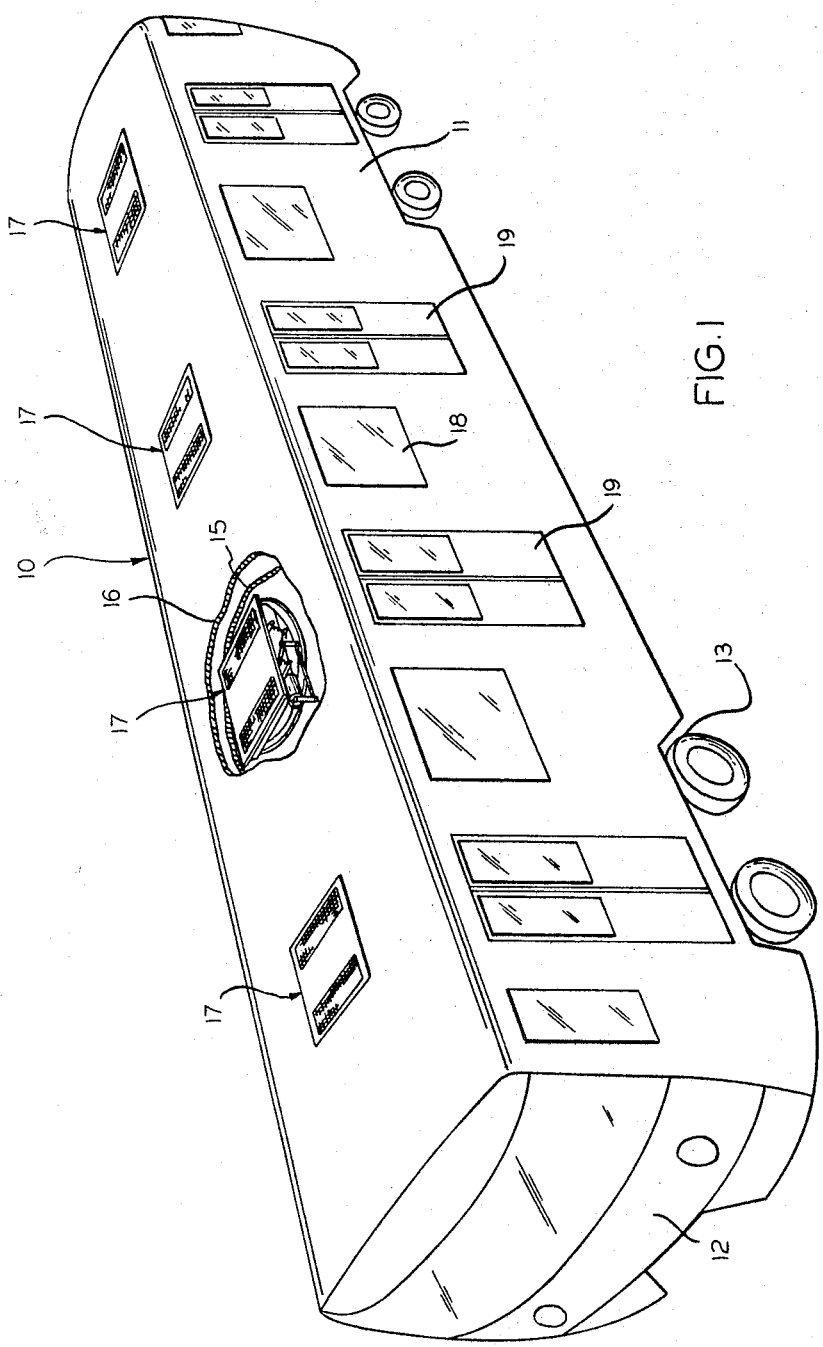
FIG. 1 is a perspective view of a passenger carrying vehicle, with some parts broken away, and illustrating the positioning of a fan unit in accordance with the invention in the roof and ceiling structure of the vehicle.

Referring now to the drawings, and particularly to FIG. 1, a passenger vehicle 10 is illustrated having side walls 11, end walls 12, a floor 13, and a roof and ceiling structure 14 including a ceiling 15 and a roof 16. A plurality of fan units 17 are mounted in the roof and ceiling structure in accordance with the invention for reinforcing the air circulation pattern within the vehicle to provide maximum passenger comfort in the ventilating cycle and the heating cycle. The usual ventilating and heating system will be provided, wherein ventilating and heated air is discharged within the vehicle and for example along the lower ends of the windows 18 between the doors 19, whereby the fan unit 17 reinforces the air circulation pattern of the usual heating and ventilating system to provide maximum passenger comfort.

Figure 2:
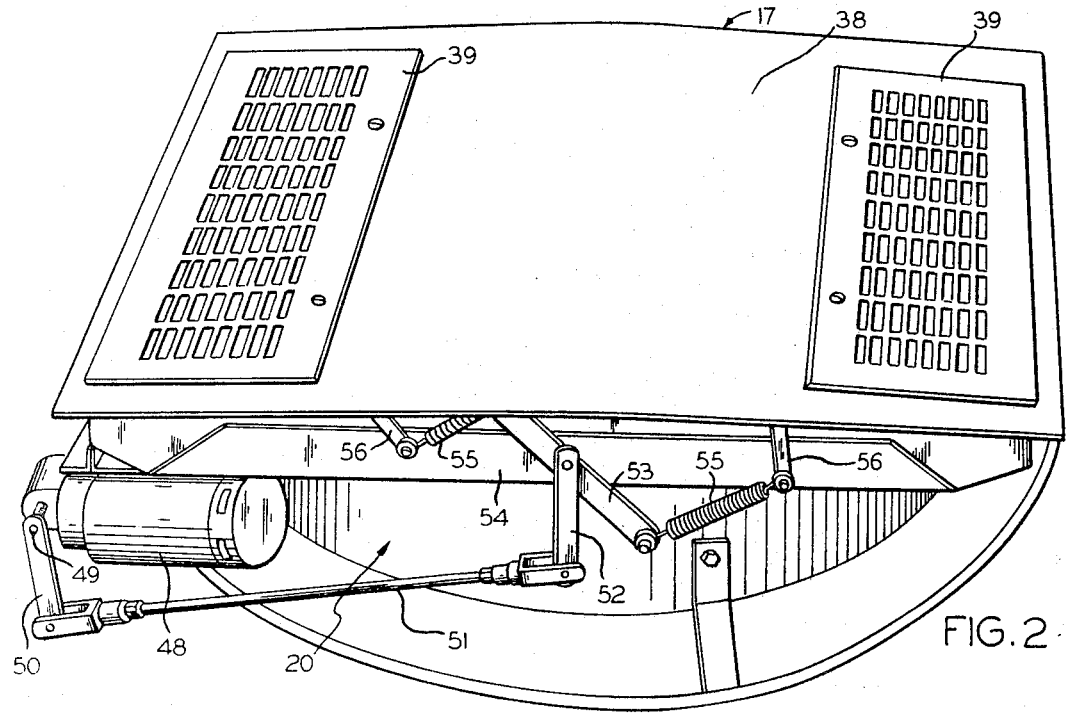
FIG. 2 is a perspective view of the fan unit according to the invention looking toward the upper side thereof.
Figure 3:
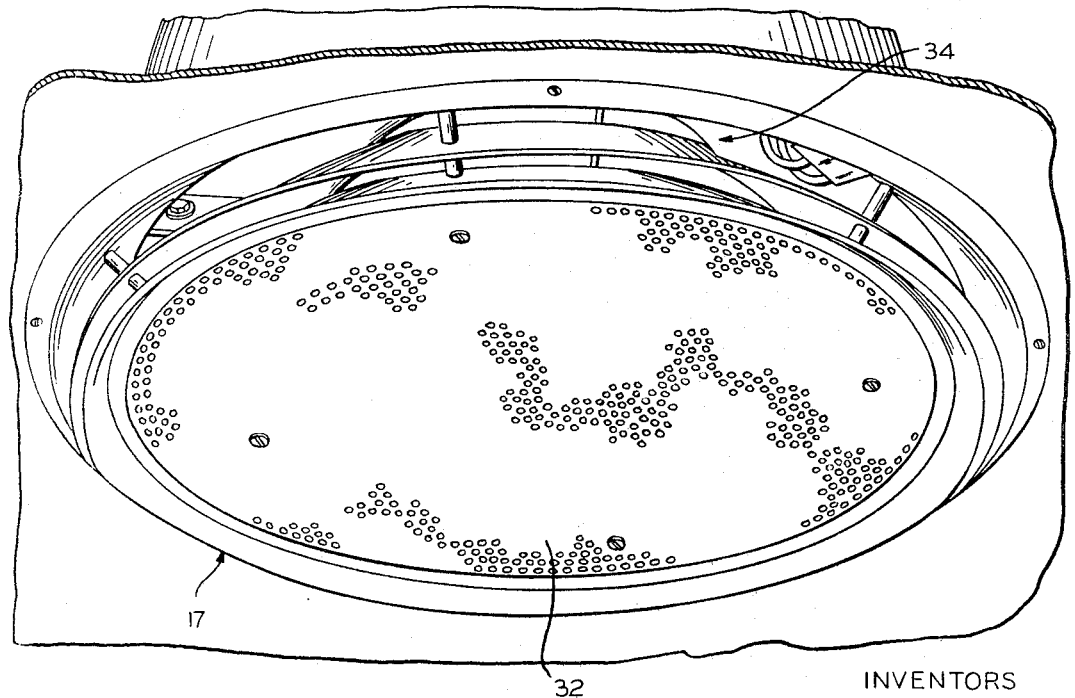
FIG. 3 is a perspective view of the unit as seen from the interior of the vehicle and as mounted in the roof and ceiling structure of the vehicle.

Referring now to FIGS. 2, 3 and 4, the fan unit 17 of the present invention includes a housing 20 that includes a center portion 21 of cylindrical shape, within which is supported a fan motor 22 having a shaft 23 with a fan 24 mounted thereon. Motor mounting brackets 25 including vibration damper means 26 mount the motor to the housing 20. The housing 20 includes a frusto-conical section 27 extending from the lower end of the cylindrical section 21 to the ceiling 15 which extends through an opening 28 formed in the ceiling 15, and terminates in a lip portion 29 that abuts against the ceiling around the opening 28 in sealing engagement therewith. A cylindrical baffle 30 is mounted peripherally of the fan 24 and defines at the lower end an air intake opening 31, that is covered over by a grill 32. The pitch of the blades on the fan 24 and the rotation thereof is such as to pull air up through the air intake opening 31.

An arcuate, inverted, U-shaped in cross section air baffle 33 extends inwardly from the upper end of the cylindrical section 21 in superposed position with a part of the fan 24 so that during operation of the fan, at least some of the air pulled through the air intake 31 hits the baffle 33 and is deflected downwardly through the louvered recirculating air discharge opening 34 and into the passenger compartment 35 of the vehicle. The air discharge opening 34 is defined by concentric frusto-conical louver sections 36 that serve to direct the air radially outwardly and into the passenger compartment.

The roof 16 is provided with a relatively rectangularly-shaped opening 37 for receiving the fan unit, which opening is covered by a panel 38 of generally rectangular shape and overlapping the roof around the opening. A pair of rectangularly-shaped exhaust roof grills 39 are provided in parallel spaced relation on the panel 38 that mate with openings in the panel 38. Arranged below each of the grills 39 is a drain trough 40 supported from the grill by a bracket 41, and having a drain pipe 42 adapted to be connected to suitable pipe or conduit for draining water falling through the grill 39 to the outside of the vehicle. The troughs 40 are arranged at opposite sides and outside of the housing 20.

A panel 43 extends inwardly from each of the troughs 40, terminating in a lip 44 to define with the panel 38 an exhaust opening 45 that may be selectively closed by a damper. In FIG. 4, one of the dampers 46 is shown in open position, while one is shown in closed position, although it should be understood that the dampers are synchronized and that both will either be open, closed, or at a like position between open and closed positions. A rain eleminator 47 extends outwardly from the inner edges of the openings for the grills 39 to deflect water passing through the grill into the troughs 40.

As seen in FIG. 2, a damper actuator 48 is mounted on the housing and includes a drive shaft 49 having a crank arm 50 secured thereto. A connecting link 51 is pivotally connected at one end to the outer end of the crank 50 and at the other end to the outer end of a crank arm 52 that is secured to a drive bar 53 pivotally mounted on a framework 54 that is carried by the housing 20. The framework 54 pivotally mounts the dampers 46, and the ends of the drive bar 53 have connected thereto an end of a spring 55 that is in turn connected to the end of a lever arm 56 driving the dampers 46 between open and closed position. Thus, operation of the damper actuator will operate the dampers 46 between open and closed position.

A heating unit 57 is arranged within the cylindrical portion 41 of the housing and below the air baffle 33, over which air is driven by the fan 24 when it is in operation. The heating element 57 may be electrically or otherwise operated, and is mounted on the motor mounting brackets 25 by suitable insulating means 58.

In operation, when it is desired to have a recirculating air cycle, with or without heat, the dampers 46 are operated to closed positions so that air brought in through the intake grill 32 by the fan is deflected by the air baffle 33 at the panel 38 and driven back downwardly and outwardly through the discharge opening 34. Of course, when it is desired to condition this air, such as by heating same, the heating element 57 is energized. During the ventilating cycle, the dampers 46 may be fully or partly open so as to exhaust a portion of the air brought in through the intake opening 41 outwardly through the exhaust roof grills 39. A portion of the air will be caught by the air baffle 33 and deflected downwardly through the discharge opening 34. It should be understood that the dampers 46 may be closed by thermostatic control which would also automatically energize the heating element 57 under thermostatic control to supplement the heat requirements during the heating cycle within the passenger compartment. Further, the fan may be operated at varying speeds under thermostatic controls to maintain a desired air flow rate-temperature ratio.

It will be understood that modifications and variations may be effected without departing from the scope of the novel concepts of the present invention, but it is understood that this application is to be limited only by the scope of the appended claims.

The invention is hereby claimed as follows:

1. In a ventilating system for a vehicle having side and end walls, a ceiling and roof thereover, a floor and doors in the side walls defining a passenger compartment, a circulating and exhaust fan unit generally mounted between the ceiling and roof, said fan unit comprising a housing, a fan mounted in said housing for rotation in a plane generally parallel to said ceiling and roof, an air inlet and an air outlet to said housing communicating through the ceiling with the passenger compartment, exhaust opening means in the housing communicating through the roof with the atmosphere, rain eliminating means mounted below the roof and adjacent the exhaust opening means to coact therewith and prevent rain from entering said housing, damper means within said housing for selectively opening and closing said exhaust opening means, and an arcuate deflecting baffle arranged above the fan, the air outlet and a part of the air inlet for deflecting a portion of the air received through said air inlet out and through said air outlet, whereby said fan unit circulates air within the passenger compartment when the damper means is closed and exhausts a portion of the air from said compartment through said exhaust opening means when the damper means is open.

2. In a ventilating system for a vehicle having side and end walls, a ceiling and roof thereover, a floor and doors in the side walls defining a passenger compartment, a circulating and exhaust fan unit generally mounted between the ceiling and roof, said fan unit comprising a housing, a fan mounted in said housing for rotation in a plane generally parallel to said ceiling and roof, an air inlet to said housing aligned with said fan and communicating through said ceiling with said passenger compartment, an annular air outlet from said housing about said air inlet communicating through the ceiling with said passenger compartment, a pair of spaced exhaust openings in the housing communicating through the roof with the atmosphere outside of the vehicle, damper means within said housing for selectively closing the exhaust openings, a heating element within said housing, whereby said fan unit circulates air within said passenger compartment when the dampers are closed and exhausts air from said compartment when the dampers are open, and means for causing some recirculation of air when the damper means are opened including an arcuate deflecting baffle arranged above the fan, the air outlet and a part of the air inlet.

3. The combination as defined in claim 2, and rain eliminating means coacting with said exhaust openings to prevent rain from entering said housing.

References Cited

UNITED STATES PATENTS

| | | | |
|---|---|---|---|
| 2,189,008 | 2/1940 | Kurth | 98—33 |
| 2,640,411 | 6/1953 | Hans | 98—40 |
| 2,700,331 | 1/1955 | Miller | 98—33 X |
| 3,221,632 | 12/1965 | Copp | 98—33 |
| 3,237,545 | 3/1966 | Gillick | 98—10 |

MEYER PERLIN, *Primary Examiner.*